US012694262B2

(12) United States Patent
Trusov et al.

(10) Patent No.: US 12,694,262 B2
(45) Date of Patent: Jul. 28, 2026

(54) ALMOST-INDIRECT CONVOLUTION IN QUANTIZED NEURAL NETWORKS

(71) Applicant: Smart Engines Service, LLC, Moscow (RU)

(72) Inventors: Anton Vsevolodovich Trusov, Moscow (RU); Elena Evgenyevna Limonova, Moscow (RU); Sergey Aleksandrovich Usilin, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 1239 days.

(21) Appl. No.: 17/495,697

(22) Filed: Oct. 6, 2021

(65) Prior Publication Data

US 2022/0309320 A1     Sep. 29, 2022

(30) Foreign Application Priority Data

Mar. 25, 2021     (RU) ................................ 2021107977

(51) Int. Cl.
    *G06N 3/04*      (2023.01)
    *G06F 9/30*      (2018.01)
    *G06F 9/38*      (2018.01)

(52) U.S. Cl.
    CPC ........... *G06N 3/04* (2013.01); *G06F 9/30036* (2013.01); *G06F 9/30138* (2013.01); *G06F 9/3814* (2013.01); *G06F 9/3887* (2013.01); *G06F 9/38873* (2023.08)

(58) Field of Classification Search
    CPC ........ G06N 3/04; G06N 3/0464; G06N 3/063; G06F 9/30036; G06F 9/30138; G06F 9/3814; G06F 9/3887; G06F 9/38873; G06F 9/3001
    See application file for complete search history.

(56) References Cited

PUBLICATIONS

Dukhan, The Indirect Convolution Algorithm, Jul. 3, 2019, pp. 1-10 (Year: 2019).*
Yang et al., A Systematic Approach to Blocking Convolutional Neural Networks, Jun. 14, 2016, pp. 1-12 (Year: 2016).*
Garofalo et al. PULP-NN: accelerating quantized neural networks on parallel ultra-low-power RISC-V processors, Philosophical Transactions: Mathematical, Physical and Engineering Sciences, Feb. 7, 2020, vol. 378, No. 2164, pp. 1-21 (Year: 2020).*
Juan et al., High Performance and Portable Convolution Operators for ARM-based Multicore, May 14, 2020, pp. 1-17 (Year: 2020).*
Liu et al., Sparse Convolutional Neural Networks, 2015, pp. 806-814 (Year: 2015).*

(Continued)

*Primary Examiner* — Viker A Lamardo
*Assistant Examiner* — Paul M Galvin-Siebenaler
(74) *Attorney, Agent, or Firm* — Shih IP Law Group, PLLC

(57) ABSTRACT

Almost-indirect convolution in quantized neural networks (QNNs). In an embodiment, an indirection buffer is allocated and initialized with pointers to block of values in an input tensor representing an input image. In one or more layers of a QNN, matrix multiplication of a left matrix by a right matrix is performed over a plurality of iterations. In each iteration, a block of one or more rows of the input tensor is packed into a first cache using the indirection buffer, and a convolution kernel is applied to the packed block to produce an output. The outputs are accumulated as an output tensor representing an output image.

11 Claims, 6 Drawing Sheets

(56) References Cited

PUBLICATIONS

Trusov et al., "Fast Implementation of 4-bit Convolutional Neural Networks for Mobile Devices", Oct. 2020, arXiv.com, arXiv: 2009. 06488v2 [cs.CV], pp. 1-7 (Year: 2020).*

Juan et al., "High Performance and Portable Convolution Operators for Multicore Processors", 2020, IEEE, 32nd International Symposium on Computer Architecture and High Performance Computing (SBAC-PAD) (Year: 2020).*

Dukhan, "Performance Primitives for Artificial Neural Networks", May 2021, Georgia Institute of Technology, Doctorate Thesis, pp. 48-54 (Year: 2021).*

Janiszewski et al., "Achieving Statistical Dependence of the CNN Response on the Input Data Distortion for OCR Problem," DOI 10.14357/20718632190409, Jan. 12, 2020, pp. 94-101.

Bezmaternykh et al., "U-Net-bin: hacking the document image binarization contest," Computer Optics 2019, 43(5), pp. 825-832.

Lin et al., "Feature Pyramid Networks for Object Detection," arXiv:1612.03144v2 [cs.CV] Apr. 19, 2017, 10 pages.

Long et al., "Fully Convolutional Networks for Semantic Segmentation," arXiv:1411.4038v2 [cs.CV] Mar. 8, 2015, 10 pages.

LeCun et al., "Gradient-Based Learning Applied to Document Recognition," Proc. of the IEEE, Nov. 1998, 46 pages.

Touvron et al., "Fixing the Train-Test Resolution Discrepancy: Fixefficientnet," arXiv:2003.08237v5 [cs.CV] Nov. 18, 2020, 5 pages.

Arlazarov et al., "Modelling the Flow of Character Recognition Results in Video Stream," Bulletin of the South Ural State University. Ser. Mathematical Modelling, Programming & Computer Software (Bulletin SUSU MMCS), 2018, vol. 11, No. 2, pp. 14-28.

Fedorenko et al., "Real-time object-to-features vectorisation via Siamese neural networks," Proc. of SPIE vol. 10341, 2017, 5 pages.

Chen et al., "Learning Efficient Object Detection Models with Knowledge Distillation," 31st Conference on Neural Information Processing Systems (NIPS 2017), 10 pages.

Molchanov et al., "Pruning Convolutional Neural Networks for Resource Efficient Inference," arXiv:1611.06440v2 [cs.LG] Jun. 8, 2017, 17 pages.

Gladilin et al., "On improvements of neural network accuracy with fixed number of active neurons," Pattern Recognition, 2016, pp. 96-105.

Limonova et al., "Convolutional Neural Network Structure Transformations for Complexity Reduction and Speed Improvement," ISSN 1054-6618, Pattern Recognition and Image Analysis, 2018, vol. 28, No. 1, pp. 24-33.

Limonova et al., "Bipolar Morphological Neural Networks: Convolution Without Multiplication," arXiv:1911.01971v1 [cs. NE] Nov. 5, 2019, 8 pages.

Gysel et al., "Hardware-Oriented Approximation of Convolutional Neural Networks," arXiv:1604.03168v1 [cs.CV] Apr. 11, 2016, 8 pages.

Ilin et al., "Fast Integer Approximations In Convolutional Neural Networks Using Layer-By-Layer Training," Proc. of SPIE vol. 10341, 2017, 5 pages.

Zhuang et al., "Towards Effective Low-bitwidth Convolutional Neural Networks," arXiv:1711.00205v2 [cs.CV] Nov. 17, 2017, 11 pages.

Alemdar et al., "Ternary Neural Networks for Resource-Efficient AI Applications," arXiv:1609.00222v2 [cs.LG] Feb. 26, 2017, 9 pages.

Zhuang et al., "Structured Binary Neural Networks for Accurate Image Classication and Semantic Segmentation," arXiv:1811. 10413v2 [cs.CV] Nov. 27, 2018, 19 pages.

Dukhan et al., "QNNPACK: Open source library for optimized mobile deep learning," Posted on Oct. 29, 2018 to Android, Developer Tools, IOS, ML Applications, Open Source, https://engineering. fb.com/2018/10/29/ml-applications/qnnpack/, 9 pages.

Trusov et al., "Fast Implementation of 4-bit Convolutional Neural Networks for Mobile Devices," arXiv:2009.06488 [cs.CV], Sep. 14, 2020, 7 pages.

Lavin et al., "Fast Algorithms for Convolutional Neural Networks," arXiv:1509.09308v2 [cs.NE] Nov. 10, 2015, 9 pages.

Anderson et al., "Low-memory GEMM-based convolution algorithms for deep neural networks," arXiv:1709.03395v1 [cs.CV] Sep. 8, 2017, 13 pages.

Marat Dukhan, "The Indirect Convolution Algorithm," arXiv:1907. 02129v1 [cs.CV] Jul. 3, 2019, 10 pages.

Goto et al., "Anatomy of High-Performance Matrix Multiplication," ACM Transactions on Mathematical Software, vol. 34, Issue 3, May 2008, Article No. 12, pp. 1-25.

Yu et al., "Multi-Scale Context Aggregation by Dilated Convolutions," arXiv:1511.07122v3 [cs.CV] Apr. 30, 2016, 13 pages.

Keras: the Python deep learning API, "Deep learning for humans," https://keras.io, Mar. 31, 2021, 4 pages.

Paszke et al., "PyTorch: An Imperative Style, High-Performance Deep Learning Library," arXiv:1912.01703v1 [cs.LG] Dec. 3, 2019, 12 pages.

Chetlur et al., "cuDNN: Efficient Primitives for Deep Learning," arXiv:1410.0759v3 [cs.NE] Dec. 18, 2014, 9 pages.

Vasilache et al., "Fast Convolutional Nets With fbfft : a GPU Performance Evaluation," arXiv:1412.7580v3 [cs.LG] Apr. 10, 2015, 17 pages.

Chellapilla et al., "High Performance Convolutional Neural Networks for Document Processing," Tenth international workshop on frontiers in handwriting recognition, Suvisoft, 2006, 6 pages.

Limonova et al., "Special Aspects of Matrix Operation Implementations for Low-Precision Neural Network Model on the Elbrus Platform," Bulletin of the South Ural StateUniversity. Ser. Mathematical Modelling, Programming & Computer Software (Bulletin SUSU MMCS), 2020, vol. 13, No. 1, pp. 118-128.

ARM® Architecture Reference Manual, ARMv7-A and ARMv7-R edition, Copyright © 1996-1998, 2000, 2004-2012, 2014, 2018 ARM Limited, entire book.

Hussain et al., "Segmentation of connected characters in text-based CAPTCHAs for intelligent character recognition," Multimed Tools Appl (2017) 76, pp. 25547-25561.

Francois Chollet, "Xception: Deep Learning with Depthwise Separable Convolutions," arXiv:1610.02357v3 [cs.CV] Apr. 4, 2017, 8 pages.

Krizhevsky et al., "ImageNet Classification with Deep Convolutional Neural Networks," Advances in neural information processing systems 25 (2012), 9 pages.

Trusov et al., "Almost Indirect 8-bit Convolution for QNNs," Proc. SPIE 11605, Thirteenth International Conference on Machine Vision, 1160507 (Jan. 4, 2021); doi: 10.1117/12.2587045, 10 pages.

* cited by examiner

FIG. 4
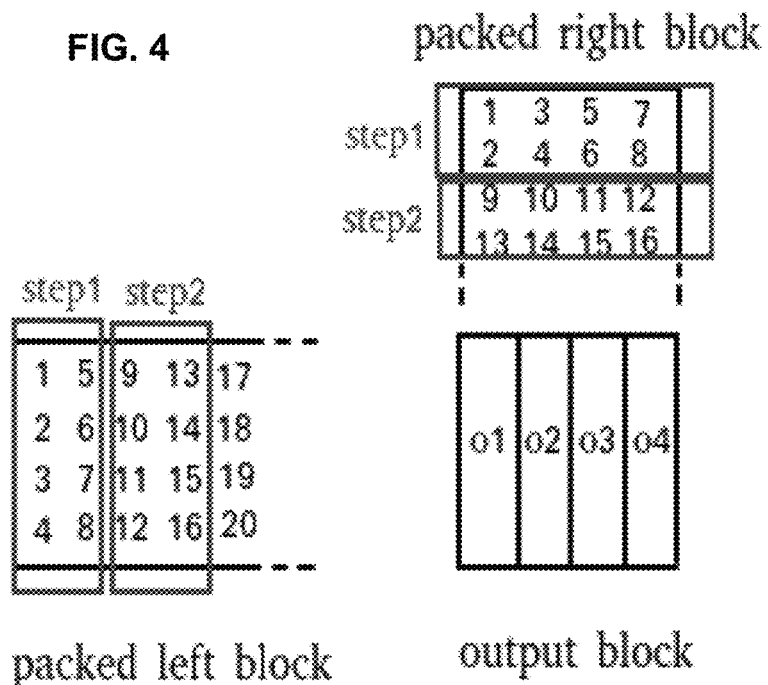
packed right block
packed left block
output block
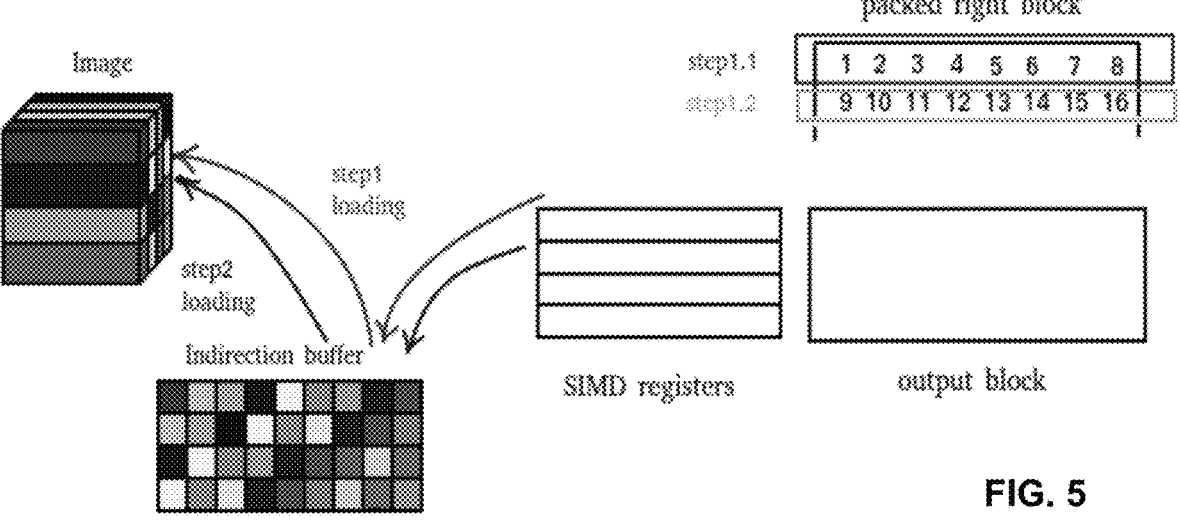
FIG. 5

GeMM-based Convolution

Indirect Convolution

Almost Indirect Convolution

ALMOST-INDIRECT CONVOLUTION IN QUANTIZED NEURAL NETWORKS

CROSS-REFERENCE TO RELATED APPLICATIONS

This application claims priority to Russian Patent App. No. 2021107977, filed on Mar. 25, 2021, which is hereby incorporated herein by reference as if set forth in full.

BACKGROUND

Field of the Invention

The embodiments described herein are generally directed to neural networks, and, more particularly, to almost-indirect convolution for quantized neural networks.

Description of the Related Art

Convolutional neural networks (CNNs) have become a major tool for solving important problems, such as pattern recognition, image binarization, object detection, semantic segmentation, and the like. As time passes, the problems become more complex and the networks become larger. For example, LeNet-5 was able to classify handwritten digits in 1998 using 60,000 trainable parameters. In contrast, FixEfficientNet, which is a state-of-the-art model for image classification of the ImageNet dataset, uses around 480,000,000 parameters. At the same time, many modern problems need to be solved in real-time on mobile devices. Such modern problems include character recognition in a video stream or real-time facial recognition. Typically, mobile devices do not have the vast amounts of random-access memory that are required to store large neural networks. Nor do mobile devices have the vast amounts of energy that are required to support billions of multiplications within neural networks. Thus, the inference speed and size of the model becomes essential when implemented on a mobile device.

There are several techniques to decrease the number of parameters, and thereby, the inference time, in a convolutional neural network. Such techniques include knowledge distillation which allows a smaller network to be trained on the soft outputs of a bigger network, pruning which removes non-informative weights, and construction of a composite model from smaller models. In addition, various tensor decompositions can reduce the complexity of a model and increase the model's inference speed, as well as use simplified models for a single neuron or layer.

In another approach, instead of decreasing the number of parameters, floating-point weights and activations are approximated using integer values of lower bit width. This allows for more effective usage of cached memory and takes full advantage of Single Instruction, Multiple Data (SIMD) extensions in modern processors, so that multiple values can be processed simultaneously. The process of approximation is called "quantization," and neural networks that are obtained using quantization are called "quantized neural networks" (QNNs).

SUMMARY

Systems, methods, and non-transitory computer-readable media are disclosed for almost-indirect convolution in quantized neural networks.

In an embodiment, a method is disclosed that uses at least one hardware processor to: receive an input tensor having an input height, an input width, and one or more input channels, wherein the input tensor represents an input image; allocate and initialize an indirection buffer comprising pointers to blocks of values in the input tensor; and, in one or more layers of a quantized neural network (QNN), perform matrix multiplication of a left matrix by a right matrix over a plurality of iterations, wherein either the left matrix represents the input image and the right matrix represents a convolution kernel or the left matrix represents a transposed convolution kernel and the right matrix represents a transposed image, and wherein the matrix multiplication comprises, in each of the plurality of iterations, packing a block of one or more rows of the input tensor into a first cache using the indirection buffer, wherein a number of the one or more rows is less than a number of all rows in the input image, and applying the convolution kernel (e.g., either the non-transposed convolution kernel or transposed convolution kernel) to the packed block to produce an output, and accumulating the outputs as an output tensor having an output height, an output width, and one or more output channels, wherein the output tensor represents an output image. The QNN may be an 8-bit QNN model.

Packing the block of one or more rows of the input image into the first cache may comprise reordering values in the one or more rows when storing the block in the first cache. An order of the pointers in the initialized indirection buffer may be identical to an order of the blocks of values in the input tensor to which the pointers refer.

The first cache may be an L1 cache of a central processing unit (CPU) of the at least one hardware processor. The method may further comprise using the at least one hardware processor to store the convolution kernel in an L2 cache of the CPU before performing the matrix multiplication. Applying the convolution kernel may comprise applying a micro-kernel, wherein the following conditions are satisfied:

$$CK_h K_w M < L_1$$

$$CK_h K_w C_o < L_2$$

wherein C is a number of the one or more input channels, $K_h$ is a height of the convolution kernel, $K_w$ is a width of the convolution kernel, M is a height of the micro-kernel, $C_o$ is a number of the one or more output channels, $L_1$ is a size of the L1 cache, and $L_2$ is a size of the L2 cache.

A size of each of the blocks of values in the input tensor may be equal to a product of the width of the convolutional kernel and a number of the one or more inputs channels.

The input image and the output image may be three-dimensional, wherein the convolution kernel is four-dimensional.

Packing the block of one or more rows of the input tensor into the first cache may comprise simultaneously packing data from the block into a plurality of single instruction, multiple data (SIMD) registers, wherein applying the convolution kernel to the packed block comprises simultaneously applying micro-kernels to the packed data in the SIMD registers. A width of the convolution kernel may be a multiple of a width of each micro-kernel. In each of the plurality of iterations, packing a block of one or more rows may comprise packing a block of M rows, wherein M is a height of each micro-kernel.

Any of the methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 4 illustrates a layout of packed blocks and the application of a GeMM micro-kernel, according to an embodiment;

FIG. 5 illustrates an example of an indirect GeMM micro-kernel;

DETAILED DESCRIPTION

In an embodiment, systems, methods, and non-transitory computer-readable media are disclosed for almost-indirect convolution in quantized neural networks. After reading this description, it will become apparent to one skilled in the art how to implement the invention in various alternative embodiments and for alternative uses. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Processing Device

Figure 1:
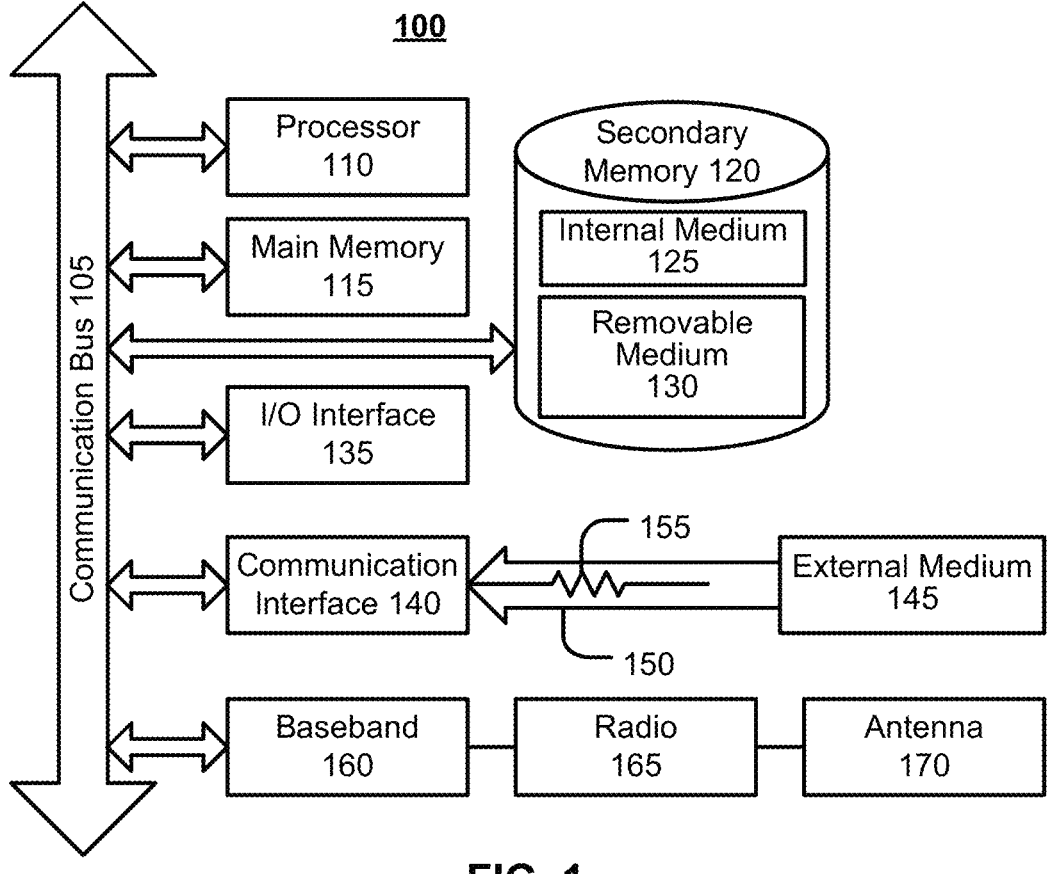
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used to execute one or more of the functions, processes, or methods described herein (e.g., one or more software modules of an application implementing the disclosed processes). System 100 can be a server (e.g., which services requests over one or more networks, including, for example, the Internet), a personal computer (e.g., desktop, laptop, or tablet computer), a mobile device (e.g., smartphone), a controller (e.g., in an autonomous vehicle, robot, etc.), or any other processor-enabled device that is capable of wired or wireless data communication. Other computer systems and/or architectures may be also used, as will be clear to those skilled in the art.

System 100 preferably includes one or more processors, such as processor 110. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 100 preferably includes a main memory 115 and may also include a secondary memory 120. Main memory 115 provides storage of instructions and data for programs executing on processor 110, such as one or more of the functions, processes, and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., one or more software modules implementing the disclosed processes) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EE-PROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or executable code may be transferred to system 100 from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/ Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as one or more software modules implementing the disclosed processes) is stored in main memory 115 and/or secondary memory 120. Computer programs can also be received via communication interface 140 and stored in main memory 115 and/or secondary memory 120. Such computer programs, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and/or external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device, in the console of a vehicle, etc.).

In an embodiment, I/O interface 135 provides an interface to a camera (not shown). for example, system 100 may be a mobile device, such as a smartphone, tablet computer, or laptop computer, with one or more integrated cameras (e.g., rear and front facing cameras). Alternatively, system 100 may be a desktop or other computing device that is connected via I/O interface 135 to an external camera. In either case, the camera captures images (e.g., photographs, video, etc.) for processing by processor(s) 110 (e.g., executing the disclosed software) and/or storage in main memory 115 and/or secondary memory 120.

System 100 may also include optional wireless communication components that facilitate wireless communication over a voice network and/or a data network. The wireless communication components comprise an antenna system 170, a radio system 165, and a baseband system 160. In such an embodiment, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 may decode the signal and convert it to an analog signal. Then, the signal is amplified and sent to a speaker. Baseband system 160 may also receive analog audio signals from a microphone. These analog audio signals may be converted to digital signals and encoded by baseband system 160. Baseband system 160 can also encode the digital signals for transmission and generate a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 may also be communicatively coupled with processor 110, which may be a central processing unit (CPU). Processor 110 has access to data storage areas 115 and 120. Processor 110 is preferably configured to execute instructions (i.e., computer programs, such one or more software modules implementing the disclosed processes) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. Process Overview

Embodiments of processes for almost-indirect convolution in quantized neural networks will now be described. It should be understood that the described processes may be embodied as an algorithm in one or more software modules, forming an application that is executed by one or more hardware processors processor 110, for example, as a software application or library. The described processes may be implemented as instructions represented in source code, object code, and/or machine code. These instructions may be executed directly by the hardware processor(s) 110, or alternatively, may be executed by a virtual machine operating between the object code and the hardware processor(s) 110. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Introduction 4-bit, 8-bit, binary, and ternary QNN models have been proposed. See, e.g., Zhuang et al., "Towards effective low-bitwidth convolutional neural networks," in Proceedings of the IEEE Conference on Computer Vision and Pattern Recognition (CVPR), 7920-7928 (2018); Gysel et al., "Hardware-oriented approximation of convolutional neural networks," arXiv preprint arXiv:1604.03168 (2016); Ilin et al., "Fast integer approximations in convolutional neural networks using layer-by-layer training," in ICMV 2016, 10341, 1-5, SPIE (2017), doi:10.1117/12.2268722; Zhuang et al., "Structured binary neural networks for accurate image classification and semantic segmentation," in Proceedings of the IEEE CVPR, 413-422 (2019); and Alemdar et al., "Ternary neural networks for resource-efficient AI applications," in 2017 Int'l Joint Conference on Neural Networks (IJCNN), 2547-2554, IEEE (2017); which are all hereby incorporated herein by reference as if set forth in full. However, since modern CPUs operate on bytes, which are 8 bits, the embodiments disclosed herein will be primarily described with respect to an 8-bit QNN model. An implementation of an 8-bit QNN model can be found in the QNNPACK library provided by Facebook, Inc. of Menlo Park, California, which is described in Dukhan et al., "QNNPACK: open source library for optimized mobile deep learning," (2018), which is hereby incorporated herein by reference as if set forth in full. An efficient implementation of a 4-bit QNN model is proposed in Trusov et al., "Fast implementation of 4-bit convolutional neural networks for mobile devices," arXiv preprint arXiv:2009.06488 (2020), which is hereby incorporated herein by reference as if set forth in full. However, it should be understood that the disclosed embodiments may be implemented for QNN models of other bit widths.

Figures 2A, 2B:
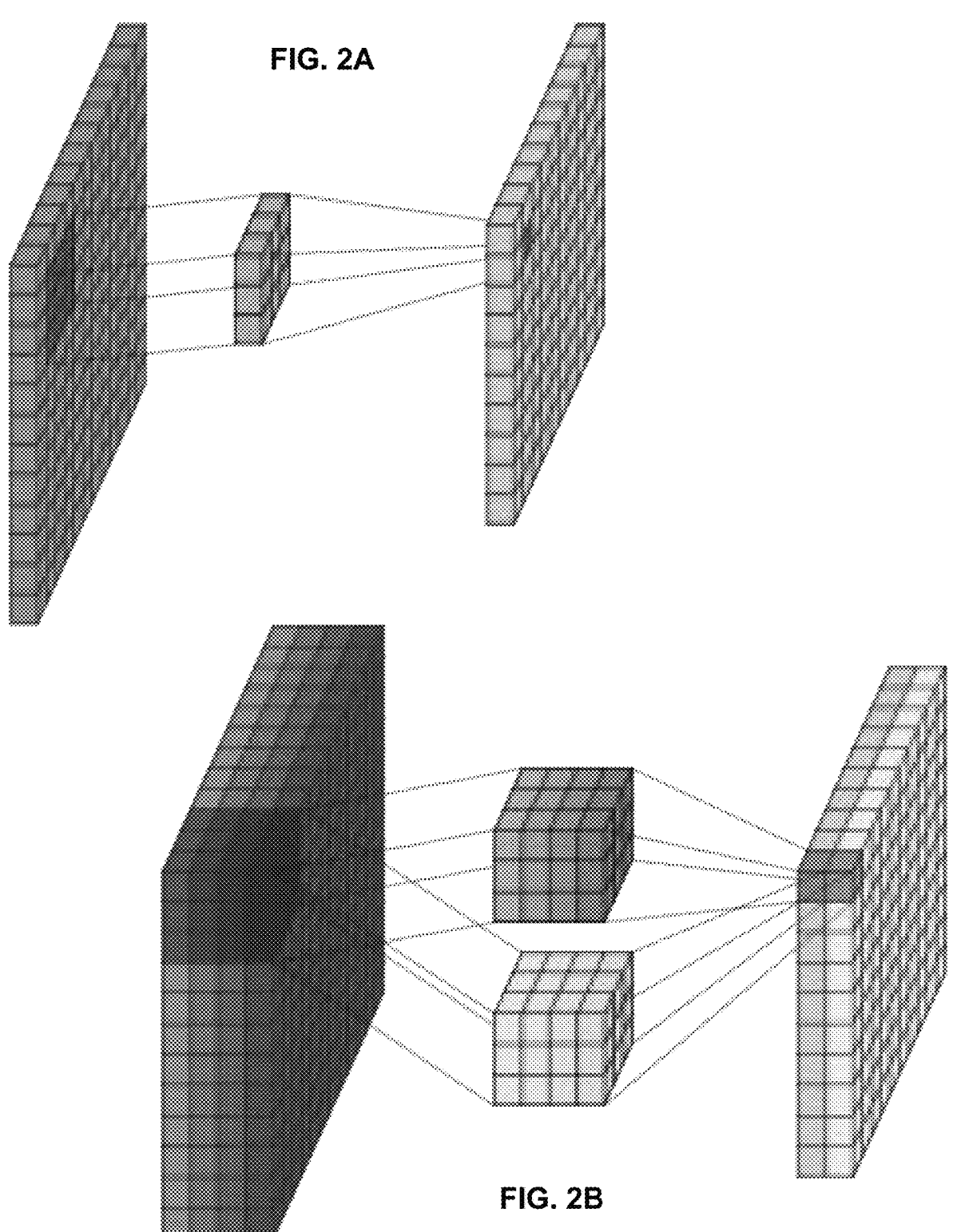
FIGS. 2A and 2B illustrate convolution operations, according to examples.

Imagine a relatively small 8-bit QNN. To decrease the inference time of the QNN, the convolution operation must be accelerated. A convolution operation for two-dimensional matrices is illustrated in FIG. 2A, and a convolutional operation for a three-dimensional input image with a four-dimensional kernel is illustrated in FIG. 2B. Since convolution operations are widely used in CNNs, there have been many attempts to accelerate their computations. See, e.g., Lavin et al., "Fast algorithms for convolutional neural networks," in Proceedings of the IEEE CVPR, 4013-4021 (2016); Anderson et al., "Low-memory GeMM-based convolution algorithms for deep neural networks," arXiv preprint arXiv:1709.03395 (2017); and Dukhan, "The indirect convolution algorithm," arXiv preprint arXiv:1907.02129 (2019); which are all hereby incorporated herein by reference as if set forth in full. Most of these approaches rely on efficient multiplication algorithms from Basic Linear Algebra Subprograms (BLAS) libraries. However, QNNs cannot simply use these algorithms, because BLAS libraries typically use the same bit widths for inputs and outputs, and this may cause an overflow in QNN convolution.

To avoid this problem, a BLAS-like library could be developed for quantized matrix multiplication. To be efficient, such a library should take CPU cache size into consideration and use SIMD instructions if available. For example, the library could utilize the algorithm for high-performance matrix multiplication described in Goto et al., "Anatomy of high-performance matrix multiplication," ACM Transactions on Mathematical Software (TOMS) 34(3), 1-25 (2008), which is hereby incorporated herein by reference as if set forth in full. The gemmlowp library, provided by Google Inc. of Mountain View, California, and described in Jacob et al., "Gemmlowp: a small self-contained low-precision GeMM library," (2017), which is hereby incorporated herein by reference as if set forth in full, is one such library. The gemmlowp library multiplies 8-bit quantized matrices and stores the output in a 32-bit matrix.

Unfortunately, converting convolution to a general matrix multiply (GeMM) problem causes significant memory overhead. There are several techniques to decrease the memory overhead. For example, multiple matrix multiplication with smaller memory overhead may be used instead of one with bigger memory overhead. See, e.g., Anderson et al. Another technique is to replace the large image-to-column (im2col) or image-to-row (im2row) buffer, required for GeMM-based convolution, with a smaller indirection buffer. An indirection buffer is a buffer of pointers to the pixels of the input image. This latter technique is called the indirect convolution algorithm, as described in Dukhan and used in the QNN-PACK library. To make it work, the GeMM multiplication micro-kernel, which is a highly optimized function that computes small parts of the output matrix using the im2col buffer, is replaced with an indirect-GeMM micro-kernel, which uses the indirection buffer. However, the indirect-GeMM micro-kernel (e.g., from or similar to that in the QNNPACK library) is less efficient than the GeMM micro-kernel (e.g., from or similar to that in the gemmlowp library).

In an embodiment, an almost-indirect convolution algorithm is disclosed, which benefits from both small memory overhead by using an indirection buffer and fast matrix multiplication using the GeMM micro-kernel. In addition, as disclosed herein, the memory footprint of the indirection buffer can be reduced several times. Disclosed embodiments demonstrate a faster convolution operation than indirect convolution and GeMM-based convolution.

2.2. Convolution Algorithms

In CNNs, a convolution operator is applied to a three-dimensional multichannel input image and four-dimensional kernel to produce a three-dimensional output image. During this process, each channel of the input image, as a matrix, is convolved with N kernel matrices. Then, the N resulting matrices are summed with the output of the convolution of other input channels, thereby yielding N channels of the output image, as illustrated in FIGS. 2A and 2B. Padding, stride, and dilation can also be introduced into the convolution operation in popular machine-learning frameworks, such as Keras and PyTorch. See, e.g., Chollet, "Keras," keras.io, (2015); and Paszke et al., "PyTorch: an imperative style, high-performance deep learning library," in Advances in Neural Information Processing Systems 32, 8024-8035, (2019); which are both hereby incorporated herein by reference as if set forth in full. Padding refers to filling the borders of the input image with zeroes or other values. Stride refers to the step between applications of the convolutional kernel that makes the output image several times smaller than the input. Dilation is described in Yu et al., "Multi-scale context aggregation by dilated convolutions," arXiv preprint arXiv:1511.07122 (2015), which is hereby incorporated herein by reference as if set forth in full.

The direct convolution algorithm below is one implementation of the convolution operation, but is not cache-friendly and is extremely inefficient:

Direct Convolution Algorithm

```
Input:
input - 3-D tensor with shape input_height x input_width x input_channels
kernel - 4-D convolution kernel with shape
        output_channels  x  output_channels  x  kernel_height  x
        kernel_width
parameters of convolution
        stride_x
        stride_y
        padding_top
        padding_left
        dilation_x
        dilation_y
Output:
output - 3-D tensor with shape output_height x output_width x
output_channels
for yₒ ∈ {0...output_height−1} do
    for xₒ ∈ {0...output_width−1} do
        for cₒ ∈ {0...output_channels−1} do
            output[yₒ][xₒ][cₒ]←0
            for yₒ ∈ {0...kernel_height−1} do
                for xₖ ∈ {0...kernel_width−1} do
                    for cᵢ ∈ {0...input_channels−1} do
                        yᵢ←yₒ*stride_y + kᵧ*dilation_y − padding_top
                        xᵢ←xₒ*stride_x + kₓ*dilation_x − padding_left
                        if 0≤xᵢ<input_width and 0≤yᵢ<input_height then
                            output[yₒ][xₒ][cₒ]←output[yₒ][xₒ][cₒ]+input[yᵢ][xᵢ][cᵢ]*
                                kernel[cₒ][cᵢ][yₖ][xₖ]
                    end
                end
            end
        end
    end
end
end
```

There have been several attempts to increase the performance of the direct convolution algorithm for specific kernels. For example, the cuDNN library optimizes convolution for specific kernel shapes. See, e.g., Chetlur et al., "cuDNN: efficient primitives for deep learning," arXiv preprint arXiv:1410.0759 (2014), which is hereby incorporated herein by reference as if set forth in full. However, for non-default kernels, the algorithm remains slow. There are also fast convolution algorithms based on the Fourier transformation or Winograd filtering. See, e.g., Vasilache et al., "Fast convolutional nets with FBFFT: a GPU performance evaluation," arXiv preprint arXiv:1412.7580 (2014), which is hereby incorporated herein by reference as if set forth in full; and Lavin et al. While these are asymptomatically faster than the direct convolution algorithm, in practice, they only outperform other state-of-the-art implementations on large inputs with large kernels, which are not suitable for mobile applications.

The convolution problem can be interpreted as a GeMM problem requiring efficient implementation of matrix multiplication with inputs and outputs of different bit widths. To move from convolution to GeMM, the three-dimensional input image is converted into a large two-dimensional matrix. See, e.g., Chellapilla et al., "High performance convolutional neural networks for document processing," (2006), which is hereby incorporated herein by reference as if set forth in full. This matrix is called "im2col" (from image to column) or "im2row" (from image to row). In the latter case, each row of the matrix contains values from the input image that are involved in the computation of a single value of the output image. Thus, the matrix contains $WHCNK_hK_w$ values, in which W and H are the width and height, respectively, of the output, C is the number of channels in the input, and $K_w$, and $K_h$ are the width and height, respectively, of the convolution kernel. Due to its size, this matrix, when buffered, causes significant memory overhead, and the initialization of the matrix can take significant time. See, e.g., Anderson et al.

To overcome this problem, Anderson et al. pointed out that convolution with a 1×1 kernel can be directly interpreted as matrix multiplication. Thus, $K_h K_w$ convolution can be replaced with $K_h K_w$ 1×1 convolutions, and their shifted results accumulated. In another solution, proposed in Dukhan, a large im2col buffer is replaced with a smaller indirection buffer, which is a buffer of pointers to the start of each row of image pixels. A GeMM-like operation can be performed over this buffer to compute the so-called indirect convolution. The QNNPACK library follows this approach.

2.3. Indirect Vs. Gemm-Based Convolution

Figure 3:
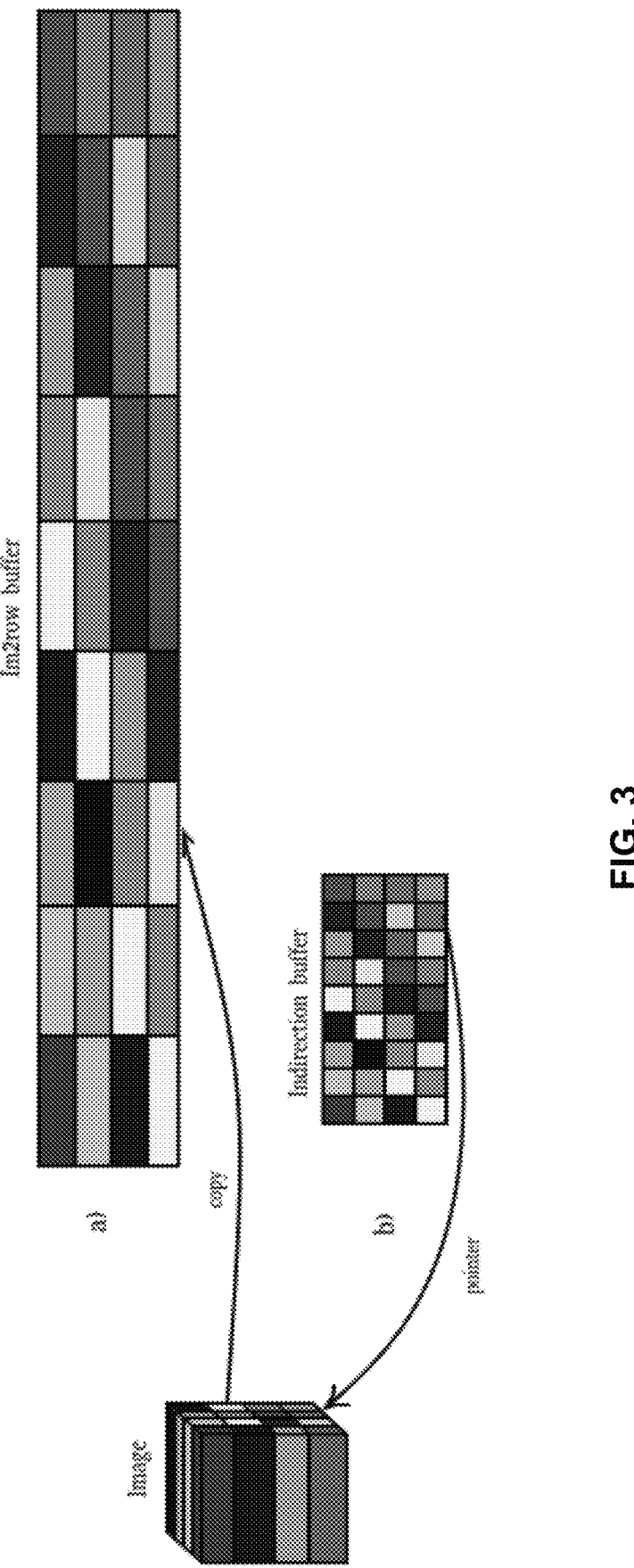
FIG. 3 illustrates data structures for direct and indirect convolution algorithms, according to an embodiment.

The initializations of the im2row buffer in GeMM-based convolution and the indirection buffer in indirect convolution will now be considered. FIG. 3 illustrates the relationship of the im2row and indirection buffers with respect to the input image, considering a 3×3 convolution without padding and with unit stride. Each block in FIG. 3 represents one multi-channel pixel.

Each row of the im2row buffer contains image pixels that are used to compute one output value (i.e., one channel of one pixel). Thus, the im2row buffer represents a WH×CK$_h$K$_W$ matrix. If the number of input channels is equal to the number of output channels, the im2row buffer contains $K_h K_w$ times more values than the output, which is a lot. To accelerate the creation of the im2row buffer, the input values can be copied to the buffer with blocks of length C (i.e., one multi-channel pixel at a time), instead of one by one. This trick is only possible if the input is stored in HWC order (i.e., channels last).

In direct convolution, once the im2row buffer has been initialized, matrix multiplication is performed. However, to efficiently perform the matrix multiplication, the left matrix (i.e., the im2row buffer representing the input image or the transposed convolution kernel) and the right matrix (i.e., the convolution kernel, represented as a matrix, or the transposed input image) must be split into blocks, with one block sized to fit into the L1 cache and the other block sized to fit into the L2 cache of the CPU. See, e.g., Goto et al. These blocks can be referred to as left and right "packed" blocks. Then, the blocks can be repacked so that data can be loaded continuously into SIMD registers. This way, it is possible to use SIMD instructions to compute several values of a result simultaneously. This operation is done in the micro-kernel function. The exact layout of the packed blocks and micro-kernel shape depends on the SIMD instruction set and the SIMD register length that are available in the CPU architecture. See, e.g., Limonova et al., "Special aspects of matrix operation implementations for low-precision neural network model on the Elbrus platform," Vestnik YuUrGU MMP 13(1), 118-128 (2020), doi:10.14529/mmp200109, which is hereby incorporated herein by reference as if set forth in full. For purposes of explanation, it will be assumed that an ARMv7-A processor with a NEON SIMD extension is used. This processor provides 128-bit and 64-bit SIMD registers. The total number of SIMD registers available in the ARMv7-A processor is sixteen.

The multiplication micro-kernel is run over the packed buffers. M×N notation will be used for the micro-kernel, which means that M rows of the im2row buffer are multiplied by N columns of the convolution kernel to compute N channels of M output pixels in one execution. FIG. 4 illustrates the layout of the packed blocks and the application of a 4×4 GeMM micro-kernel (e.g., as implemented in the gemmlowp library), according to an embodiment. The first two iterations of the micro-kernel are illustrated, with numbers denoting the order of elements in the packed blocks. In one iteration, the micro-kernel loads eight 8-bit values from the left and right packed blocks into 64-bit SIMD registers, multiplies the left packed block by the right packed block, and accumulates their product in four 128-bit SIMD registers (o1, o2, o3, and o4) of 32-bit integers. The 12×4 micro-kernel that was used is a simple unrolling of three 4×4 micro-kernel applications. The micro-kernel processes twelve rows of input at a time, and stores the output in twelve 128-bit output registers.

Now indirect convolution, using an indirection buffer, will be described. The idea behind the indirection buffer is to store pointers to the beginnings of blocks of values, instead of copying those blocks of values into an im2row buffer. As implemented in the QNNPACK library, the indirection buffer comprises a buffer of pointers of size WH×K$_w$K$_h$ (although the storage order of the pointers in the indirection buffer is slightly different for purposes of GeMM-like operation, referred to as "indirect matrix multiplication" for simplicity).

In an embodiment, if the convolution has unit dilation, which is often the case, and the input already contains padding or there is no padding, the pointers can be to blocks of size K$_w$C. Thus, advantageously, the indirection buffer becomes K$_w$ times smaller than the conventional indirection buffer.

In indirect matrix multiplication, the same micro-kernels cannot be used, as in direct matrix multiplication, because there is no packed left buffer. While the kernel matrix (e.g., right matrix) can be packed as before, there is only an indirection buffer of pointers in place of the left matrix. To overcome this problem, an indirect GeMM micro-kernel can be introduced that loads the values of the left matrix—which does not actually exist in the algorithm but is used indirectly—from the input image via the indirection buffer. Since values are not reordered, the values of the left matrix can only be loaded into the SIMD registers in the order in which they are stored in the input image. In each iteration of the indirect GeMM micro-kernel, several blocks of pixels are loaded from the input image into SIMD registers and multiplied by a block of the right matrix. This block of the right matrix should have the same height as the width of an SIMD register. Since there are not enough SIMD registers to load all of the values at the same time, it is done sequentially. In both Dukhan and the QNNPACK library, a 4×8 indirect GeMM micro-kernel is used. The QNNPACK library also has an 8×8 micro-kernel for ARMv8 processors, because ARMv8 supports more SIMD registers.

FIG. 5 illustrates the work of a 4×8 indirect GeMM micro-kernel, according to an example. In each iteration, parts of image rows are loaded into four SIMD registers via the indirection buffer. Then, the values in the loaded parts of the image rows are sequentially multiplied by registers that are loaded from a packed right block.

The advantages of indirect convolution over direct convolution include: eliminating expensive and memory-intensive im2col or im2row transformations; enabling replacement of the im2col buffer with a much smaller indirection buffer; and if the height and width of the input or output images are constant for the network, only needing to initialize the indirection buffer once. However, in many applications, such as fully convolutional segmentation networks, the height and width of the input or output images are not constant, which means that the last advantage cannot be achieved. Indirect convolution also has limitations, including: it is optimized for the channels-last layout of the input image, so that each pixel must be stored consecutively in memory; it is optimized for the forward pass of the convolution operator and has limited applicability to the backward pass; and similarly to GeMM-based convolution, the indirect convolution algorithm is not efficient for depth-wise convolutions.

2.4. Almost-Indirect Vs. Indirect Convolution

A direct GeMM kernel utilizes resources more effectively than an indirect GeMM kernel. For example, a 12×4 micro-kernel computes forty-eight 32-bit integers at a time, whereas a 4×8 indirect GeMM micro-kernel only computes thirty-two 32-bit integers at a time. Also, a neural network can reach maximum performance when the width of the right matrix in the GeMM operation (i.e., the number of channels of the output image) is a multiple of the width of the micro-kernel. For example, the width of the first kernel is four, while the width of the second kernel is eight, which is a greater constraint on the structure of the neural network.

Figure 6:
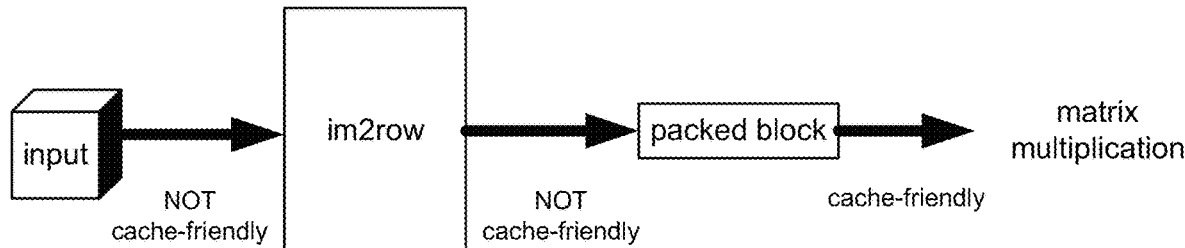
FIG. 6 illustrates the data structures of three different convolution algorithms.
Figure 6:
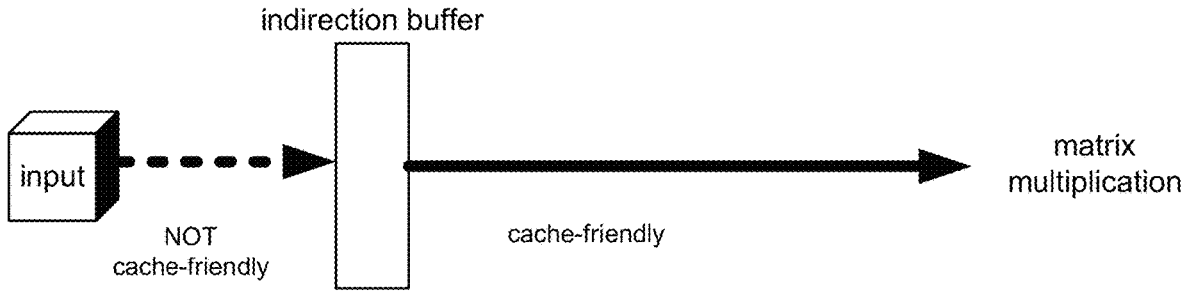
Figure 6:
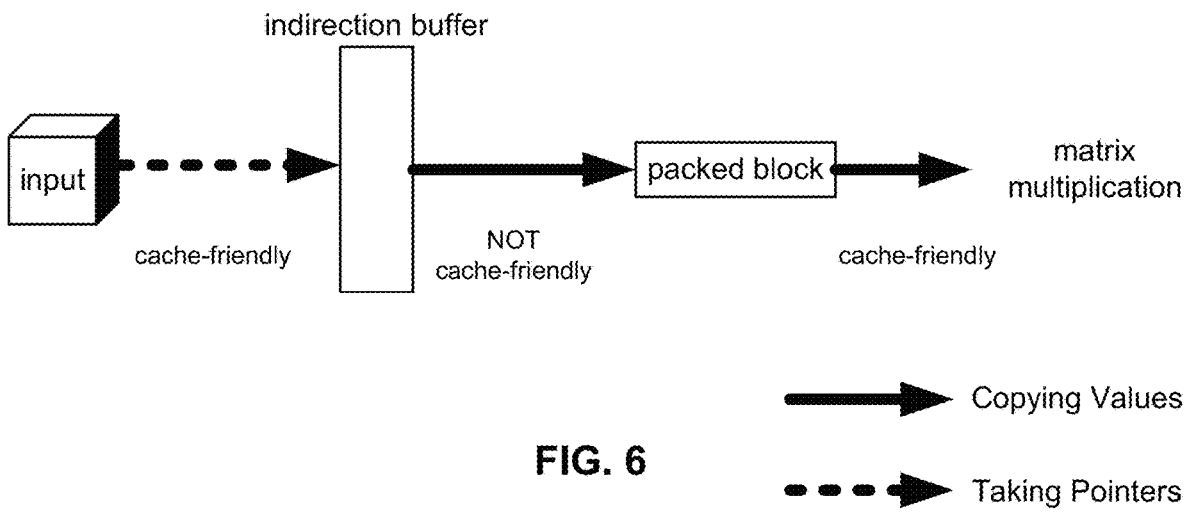

In an embodiment, to avoid some of the disadvantages of indirect convolution, while preserving the benefits of indirect convolution, the packed left block is initialized from the indirection buffer. This way, the small memory footprint of the indirection buffer is combined with the higher computational efficiency and flexibility (in shape) of the GeMM micro-kernel. In the absence of dilation and padding, the size of the indirection buffer can be decreased $K_w$ times, where $K_w$ is the width of the convolution kernel. The pointers in the indirection buffer are not reordered (i.e., the order of the pointers is identical to the order of the values to which they refer), thereby making the initialization of the indirection buffer cache-friendly. The packing of the left block serves this purpose, as illustrated in FIG. 6.

Notably, the memory footprint of the disclosed almost-indirect convolution algorithm is slightly bigger than the memory footprint of the indirect convolution algorithm, since the almost-indirect convolution algorithm utilizes a packed left block. However, the size of this packed left block is very small and does not depend on the output size. It is also worth noting that the initialization of the buffer for the packed left block is not cache-friendly and requires additional time. However, experimentally, the summed work time of this initialization and the GeMM micro-kernel is less than that of the indirect GeMM micro-kernel.

2.5. Example Implementation

In an embodiment, to make the micro-kernel cache-friendly in almost-indirect convolution, reordered values are stored in the packed left block. However, the entire left matrix does not need to be reordered. Rather, in an embodiment, only M rows are packed into the left block at a time, where M is the height of the micro-kernel (e.g., twelve in a particular implementation). Thus, the memory overhead is an insignificant $CK_hK_wM$ bytes. If the following conditions are satisfied, the almost-indirect convolution algorithm will be cache-friendly without the need for any additional splitting of the left block and right matrix:

$$CK_hK_wM < L_1 \qquad (1)$$

$$CK_hK_wC_o < L_2 \qquad (2)$$

wherein $L_1$ is the size of the L1-cache, $L_2$ is the size of the L2-cache, and $C_o$ is the number of output channels. This means that the entire left block is stored in the L1-cache, and the entire right matrix is stored in the L2-cache.

The above conditions (1) and (2) will hold true for small QNN models. For example, all of the Cortex-A processors, starting from Cortex-A9, have at least 16 kilobytes (KB) of L1-cache and 256 KB to 8 megabytes (MB) of L2-cache. This limits the number of channels for 5×5 convolution kernels to 52 channels, and limits the number of channels for 3×3 convolution kernels to 151 channels, which is more than enough for mobile recognition. Notably, sparse block convolutions, as described in Krizhevsky et al., "ImageNet classification with deep convolutional neural networks," in Advances in Neural Information Processing Systems, 1097-1105 (2012), which is hereby incorporated herein by reference as if set forth in full, can ease conditions (1) and (2) even further.

Below is one implementation of the almost-indirect convolution algorithm, according to an embodiment:

Almost-Indirect Convolution Algorithm

```
Input:
input - 3-D tensor with shape
        input_height x input_width x input_channels
kernel - 4-D convolution kernel with shape
        output_channels  x  output_channels  x  kernel_height  x
        kernel_width
conv_params - parameters of convolution (e.g., input and output sizes)
quant_params - parameters for quantization
Output:
output - 3-D tensor with shape output_height x output_width x
output_channels
indirection ← allocate_indirection_buffer(conv_params)
indirection ← initialize_indirection_buffer(conv_params, input)
left block ← allocate_left_block(conv_params)
step ← 12
rows ← output_width * output_height
row ← 0
while row < rows do
    height ← min(step, rows-row)
    left_block ← pack_left_block(conv_params, indirection, row, height)
    output[row...row+height] ← kernel(conv_params, quant_params,
        left_block, kernel)
    row ← row + step
end
```

In the almost-indirect convolution algorithm, quant_params is a special set of parameters needed for quantization, including scales, zero points, and the like. See, e.g., Jacob et al. First, the indirection buffer is allocated and initialized. Notably, the indirection buffer does not need to be initialized for every convolution operation in the neural network, if the parameters (e.g., input size) are fixed. Thus, this step is optional. Next, the algorithm loops over blocks of rows in the indirection buffer and unpacks them into left block in the proper order for the micro-kernel. The kernel function is then called, which iterates through the columns of the filters matrix (i.e., output channels), calls a micro-kernel function, and processes tails (i.e., some rows and columns that do not fit into the micro-kernel in cases in which the size of the resulting matrix is not a multiple of the size of the micro-kernel). The result of the kernel function is a 32-bit output. Finally, memory that is no longer needed is freed.

3. Experimental Results

Experimental results of particular implementations of the almost-indirect convolution algorithm, according to embodiments, will now be discussed. In the experiment, three algorithms were tested, which will be referred to herein as follows: (A) traditional GeMM-based convolution; (B) indirect convolution, as described in Dukhan; and (C) the almost-indirect convolution disclosed herein. Input images were randomly initialized with linear sizes from 4 to 128, and 3×3 and 5×5 convolution kernels were used. During the experiment, the number of input and output channels were the same, and 8, 16, 24, and 32 channels were tested. All sizes were similar to those that can be found in the real-world application of QNNs in mobile devices. The time for initialization (i.e., initialization of the indirection buffer for algorithms B and C, and im2row transformation for algorithm A) and the time for matrix multiplication (including initialization of the packed left block for algorithms A and C) were measured separately. For each experiment, the average over one-hundred runs was taken, then repeated several times so that the total time per experiment was approximately one minute, and the median was taken as the result. All tests were performed on the ODROID-XU4 device with a Samsung Exynos5422 ARMv7 processor.

The table below depicts the results of the experiment, with percentages in parentheses denoting the difference in time of algorithms B and C relative to algorithm A:

| Channels × Kernel Size | Algorithm | Initialization (µs/pixel) | Matrix Multiplication (µs/pixel) | Total (µs/pixel) |
|---|---|---|---|---|
| 8 × 3 × 3 | A | 0.028 | 0.138 | 0.166 |
| | B | 0.045 | 0.133 | 0.178 (+7%) |
| | C | 0.009 | 0.138 | 0.147 (−11%) |
| 8 × 5 × 5 | A | 0.044 | 0.353 | 0.397 |
| | B | 0.093 | 0.324 | 0.416 (+9%) |
| | C | 0.013 | 0.302 | 0.315 (−16%) |
| 8 × 7 × 7 | A | 0.067 | 0.669 | 0.736 |
| | B | 0.141 | 0.591 | 0.732 (−0.5%) |
| | C | 0.014 | 0.534 | 0.548 (−25%) |
| 16 × 3 × 3 | A | 0.031 | 0.477 | 0.508 |
| | B | 0.045 | 0.481 | 0.526 (+3%) |
| | C | 0.009 | 0.445 | 0.454 (−11%) |
| 16 × 5 × 5 | A | 0.093 | 1.34 | 1.43 |
| | B | 0.093 | 1.21 | 1.31 (−8%) |
| | C | 0.013 | 1.11 | 1.13 (−21%) |
| 16 × 7 × 7 | A | 0.134 | 2.52 | 2.65 |
| | B | 0.141 | 2.20 | 2.34 (−12%) |
| | C | 0.014 | 2.06 | 2.07 (−22%) |
| 24 × 3 × 3 | A | 0.056 | 1.05 | 1.11 |
| | B | 0.045 | 1.06 | 1.10 (−1%) |
| | C | 0.009 | 0.96 | 0.97 (−13%) |
| 24 × 5 × 5 | A | 0.199 | 2.93 | 3.13 |
| | B | 0.093 | 2.68 | 2.77 (−12%) |
| | C | 0.013 | 2.50 | 2.51 (−20%) |
| 24 × 7 × 7 | A | 0.378 | 5.61 | 5.99 |
| | B | 0.141 | 4.91 | 5.06 (−15%) |
| | C | 0.014 | 5.20 | 5.21 (−13%) |
| 32 × 3 × 3 | A | 0.054 | 1.81 | 1.87 |
| | B | 0.045 | 1.87 | 1.91 (+2%) |
| | C | 0.009 | 1.75 | 1.76 (−6%) |
| 32 × 5 × 5 | A | 0.145 | 5.42 | 5.56 |
| | B | 0.093 | 4.77 | 4.87 (−14%) |
| | C | 0.013 | 5.00 | 5.01 (−11%) |
| 32 × 7 × 7 | A | 0.274 | 10.6 | 10.9 |
| | B | 0.141 | 8.73 | 8.88 (−18%) |
| | C | 0.014 | 10.2 | 10.2 (−6%) |

As demonstrated by the results, indirect convolution is competitive with GeMM-based convolution, and the disclosed almost-indirect convolution outperforms GeMM-based convolution by 10-20%, while maintaining the small memory footprint of indirect convolution. The gap between almost-indirect and indirect convolution narrows as the number of channels increase (e.g., from 14% to 24% for 8 channels to −12% to 11% for 24 and 32 channels). This is because, as the length of the padded left block increases, the initialization time of the padded left block increases.

4. Example Embodiment

Implementations of convolution operations in neural networks are usually based on convolution-to-GeMM transformation. However, this transformation requires a large intermediate buffer (i.e., im2col or im2row), and its initialization consumes both memory and time. Indirect convolution was introduced to overcome this problem. Indirect convolution replaces the im2row buffer with a much smaller buffer of pointers (i.e., the indirection buffer). However, indirect convolution limits flexibility in the choice of the multiplication micro-kernel, which renders matrix multiplication less efficient than in the classical GeMM algorithm.

In an embodiment, to overcome these problems, almost-indirect convolution is used for 8-bit quantized matrices in a QNN. Almost-indirect convolution unites the fast and flexible matrix multiplication micro-kernels of classical GeMM-based convolution with the small memory footprint of the indirect convolution algorithm. The cache structure of modern CPUs may be taken into consideration. The almost-indirect convolution algorithm initializes small specifically ordered blocks of values, which are used in matrix multiplication, via the indirection buffer, in the same manner that the GeMM algorithm initializes one block from the im2row buffer. Specifically, in the matrix multiplication of the almost-indirect convolution algorithm, the GeMM-like micro-kernel is applied to a small block of the left matrix that is initialized from an indirection buffer, rather than being applied to the indirection buffer itself. The initialization of the indirection buffer may be simplified by eliminating reordering in the indirection buffer and, when there is no padding or dilation in the convolution, decreasing the size of the indirection buffer.

Figure 7:
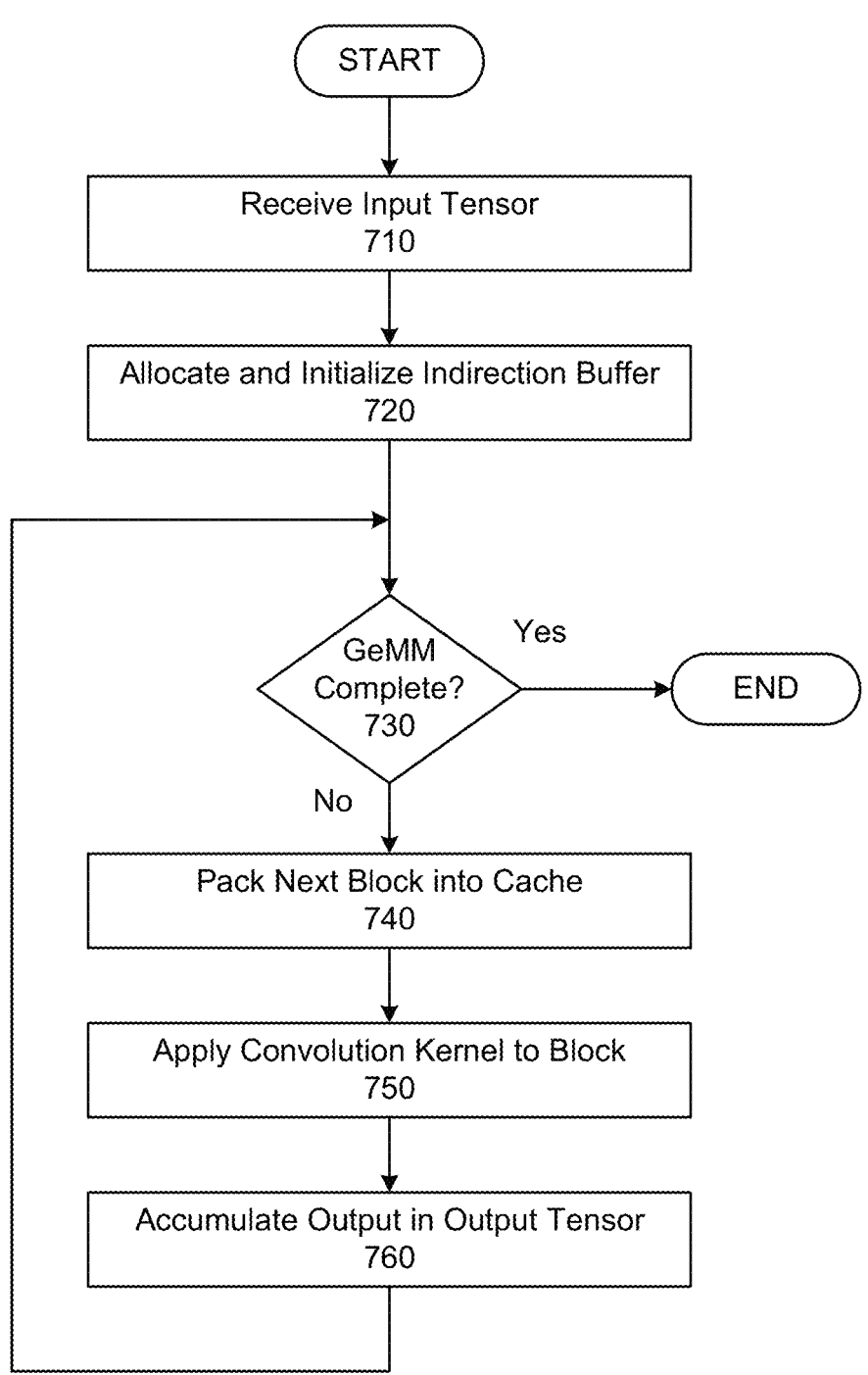
FIG. 7 illustrates an almost-indirect convolution algorithm, according to an embodiment.

FIG. 7 illustrates the almost-indirect convolution algorithm, according to an embodiment. Initially, in subprocess 710, an input tensor is received. The input tensor has an input height, an input width, and one or more input channels, and represents an input image. In subprocess 720, an indirection buffer is allocated and initialized. The indirection buffer comprises pointers to blocks of values in the input tensor. To be cache-friendly, the pointers are not reordered (i.e., the pointers are in the same order as the blocks to which they refer). In subprocess 730, the algorithm loops until the matrix multiplication is completed. Once the matrix multiplication is complete (i.e., "Yes"), the process may end.

In the loop formed by subprocess 730, the next block is packed into the cache (e.g., L1 cache) of the CPU in subprocess 740, and the convolution kernel is applied to the packed block to produce an output in subprocess 750. It should be understood that each packed block may comprise one or more rows of the input tensor, and that the number of rows in each packed block is less than the total number of rows in the input tensor. In particular, the number of rows in each packed block may be equal to the height of the micro-kernel that is applied to the packed block. The micro-kernel may also be stored in the cache (e.g., L2 cache) of the CPU. Values may be reordered when packing each block in subprocess 740.

In subprocess 760, the outputs of each subprocess 750 are accumulated in an output tensor. The output tensor has an output height, an output width, and one or more output channels, and represents an output image (i.e., the convolution of the input image).

The disclosed almost-indirect convolution algorithm increases the speed of convolution by 10-20%, relative to the classical GeMM-based algorithm. It is also 14-25% faster than indirect convolution for a small number of channels. In addition, the quality of results is not affected. Thus, the disclosed almost-indirect convolution algorithm is perfect for the inference of relatively compact 8-bit convolutional layers in QNNs operating on mobile devices. It suits QNNs regardless of how the QNNs are trained, what quantization scheme the QNNs utilize, and whether the QNNs are fully quantized or use mixed precision in different layers.

The left matrix is primarily described herein as representing the input image and the right matrix is primarily described as representing the convolution kernel in a convolution layer. However, it should be understood that, in a deconvolution layer, the left matrix would represent the transposed convolution kernel, and the right matrix would represent the transposed input image.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:

receive an input tensor having an input height, an input width, and one or more input channels, wherein the input tensor represents an input image;

allocate and initialize an indirection buffer comprising pointers to blocks of values in the input tensor; and, in one or more layers of a quantized neural network (QNN), perform matrix multiplication of a left matrix by a right matrix over a plurality of iterations, wherein either the left matrix represents the input image and the right matrix represents a convolution kernel or the left matrix represents a transposed convolution kernel and the right matrix represents a transposed image, and wherein the matrix multiplication comprises, in each of the plurality of iterations, packing a block of one or more rows of the input tensor into a first cache using the indirection buffer, wherein a number of the one or more rows is less than a number of all rows in the input image, wherein the first cache is an L1 cache of a central processing unit (CPU) of the at least one hardware processor, using the at least one hardware processor to store the convolution kernel in an L2 cache of the CPU before performing the matrix multiplication, and applying the convolution kernel to the packed block to produce an output, wherein applying the convolution kernel comprises applying a micro-kernel, and wherein the following conditions are satisfied:

$$CK_hK_wM < L_1$$
$$CK_hK_wC_o < L_2$$

wherein C is a number of the one or more input channels, $K_h$ is a height of the convolution kernel, $K_w$ is a width of the convolution kernel, M is a height of the micro-kernel, C, is a number of the one or more output channels, $L_1$ is a size of the L1 cache, and $L_2$ is a size of the L2 cache, and accumulating the outputs as an output tensor having an output height, an output width, and one or more output channels, wherein the output tensor represents an output image.

2. The method of claim 1, wherein the packing the block of one or more rows of the input tensor into the first cache comprises reordering values in the one or more rows when storing the block in the first cache.

3. The method of claim 2, wherein an order of the pointers in the initialized indirection buffer is identical to an order of the blocks of values in the input tensor to which the pointers refer.

4. The method of claim 1, wherein a size of each of the blocks of values in the input tensor is equal to a product of the width of the convolutional kernel and a number of the one or more inputs channels.

5. The method of claim 1, wherein the input image and the output image are three-dimensional, and wherein the convolution kernel is four-dimensional.

6. The method of claim 1, wherein the packing the block of one or more rows of the input tensor into the first cache comprises simultaneously packing data from the block into a plurality of single instruction, multiple data (SIMD) registers, and wherein applying the convolution kernel to the packed block comprises simultaneously applying micro-kernels to the packed data in the SIMD registers.

7. The method of claim 6, wherein a width of the convolution kernel is a multiple of a width of each micro-kernel.

8. The method of claim 6, wherein, in each of the plurality of iterations, the packing the block of one or more rows comprises packing a block of M rows, wherein M is a height of each micro-kernel.

9. The method of claim 1, wherein the QNN is an 8-bit QNN model.

10. A system comprising:

at least one hardware processor; and one or more software modules that are configured to, when executed by the at least one hardware processor, receive an input tensor having an input height, an input width, and one or more input channels, wherein the input tensor represents an input image, allocate and initialize an indirection buffer comprising pointers to blocks of values in the input tensor, and, in one or more layers of a quantized neural network (QNN), perform matrix multiplication of a left matrix, representing one of the input image or a convolution kernel, by a right matrix, representing the other one of the input image or the convolution kernel, over a plurality of iterations by, in each of the plurality of iterations, packing a block of one or more rows of the input tensor into a first cache using the indirection buffer, wherein a number of the one or more rows is less than a number of all rows in the input image, wherein the first cache is an L1 cache of a central processing unit (CPU) of the at least one hardware processor, using the at least one hardware processor to store the convolution kernel in an L2 cache of the CPU before performing the matrix multiplication, and applying the convolution kernel to the packed block to produce an output, wherein applying the convolution kernel comprises applying a micro-kernel, and wherein the following conditions are satisfied:

$$CK_h K_w M < L_1$$

$$CK_h K_w C_o < L_2$$

wherein C is a number of the one or more input channels, $K_h$ is a height of the convolution kernel, $K_w$ is a width of the convolution kernel, M is a height of the micro-kernel, $C_o$ is a number of the one or more output channels, $L_1$ is a size of the L1 cache, and $L_2$ is a size of the L2 cache, and accumulating the outputs as an output tensor having an output height, an output width, and one or more output channels, wherein the output tensor represents an output image.

11. A non-transitory computer-readable medium having instructed stored thereon, wherein the instructions, when executed by a processor, cause the processor to:

receive an input tensor having an input height, an input width, and one or more input channels, wherein the input tensor represents an input image;

allocate and initialize an indirection buffer comprising pointers to blocks of values in the input tensor; and, in one or more layers of a quantized neural network (QNN), perform matrix multiplication of a left matrix, representing one of the input image or a convolution kernel, by a right matrix, representing the other one of the input image or the convolution kernel, over a plurality of iterations by, in each of the plurality of iterations, packing a block of one or more rows of the input tensor into a first cache using the indirection buffer, wherein a number of the one or more rows is less than a number of all rows in the input image, wherein the first cache is an L1 cache of a central processing unit (CPU) of the at least one hardware processor, using the at least one hardware processor to store the convolution kernel in an L2 cache of the CPU before performing the matrix multiplication, and applying the convolution kernel to the packed block to produce an output, wherein applying the convolution kernel comprises applying a micro-kernel, and wherein the following conditions are satisfied:

$$CK_h K_w M < L_1$$

$$CK_h K_w C_o < L_2$$

wherein C is a number of the one or more input channels, $K_h$ is a height of the convolution kernel, $K_w$ is a width of the convolution kernel, M is a height of the micro-kernel, $C_o$ is a number of the one or more output channels, $L_1$ is a size of the L1 cache, and $L_2$ is a size of the L2 cache, and accumulating the outputs as an output tensor having an output height, an output width, and one or more output channels, wherein the output tensor represents an output image.

* * * * *